Oct. 22, 1963    A. W. KLOMP    3,107,506
UNIVERSAL JOINT
Filed Oct. 12, 1961
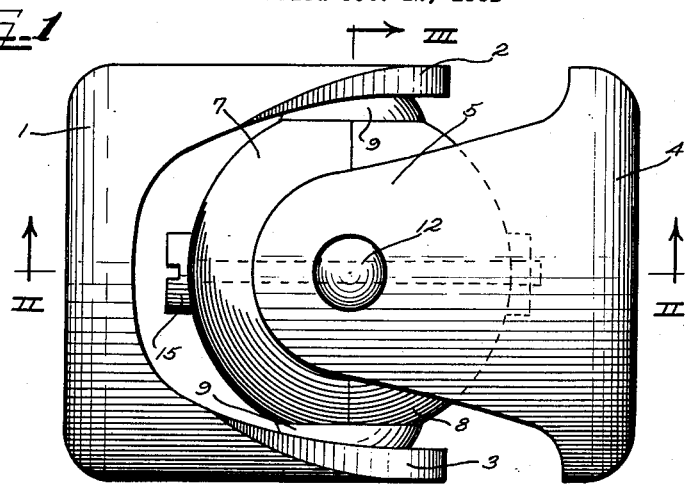
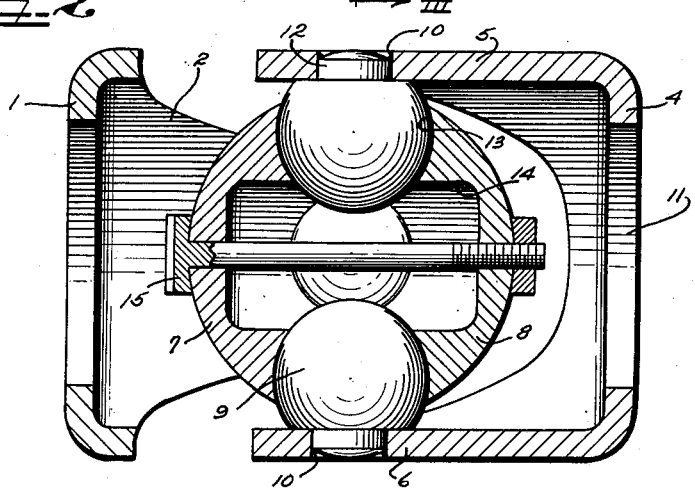
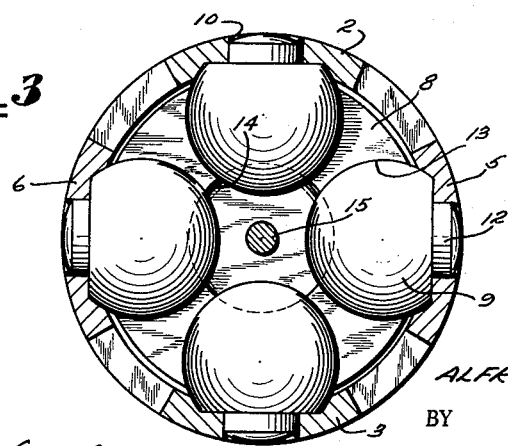
INVENTOR.
ALFRED W. KLOMP
BY
ATTORNEYS

United States Patent Office 3,107,506
Patented Oct. 22, 1963

3,107,506
UNIVERSAL JOINT
Alfred W. Klomp, Detroit, Mich., assignor to Process Gear & Machine Co., Detroit, Mich., a corporation of Michigan
Filed Oct. 12, 1961, Ser. No. 144,786
3 Claims. (Cl. 64—17)

This invention relates to improvements in a universal joint, and more particularly to a universal joint highly desirable for use wherever a cardan or Hooke's type joint may be used, although by virtue of its construction the instant universal joint is capable of operating at a greater angle between the shafts than a Hooke's or cardan joint, and will be suitable for other uses and purposes as will be apparent to one skilled in the art.

In the past, many and various types of universal joints, generally of the cardan or Hooke types, have been developed but have proven objectionable in that they were relatively short lived, required expensive and fine machining of bearing surfaces, were not as easy and economical to assemble as is desired, required lubrication at relatively short intervals of time and in many cases required lubricant fittings on the joints, did not possess a desirably heavy load capacity in comparison with the size of the joint, and where such joints had a rubbing or sliding contact between bearing surfaces as distinguished from rolling contact, such surfaces were subject to injury from bending forces during use of the joint and further subject to wear after extremely short usage resulting in looseness between the parts.

With the foregoing in mind, it is an important object of the instant invention to provide an extremely economical universal joint having an exceptionally high load capacity in comparison with the size of the joint.

Another object of the invention is the provision of a strong universal joint in which the body member of the joint holds the arms of the yokes against spreading whereby the joint cannot fall apart in use.

Also an object of the invention is the provision of an extremely long lived universal joint of an economical character, in which the bearing surfaces which have rubbing or sliding contact with each other are spherical rather than cylindrical and the bearings are not subject to adverse effects from bending forces and do not require fine machining.

A further desideratum of this invention resides in the provision of a strong, long lived universal joint having large bearing surfaces in comparison with the size of the joint whereby wear is lessened considerably.

A further object of the instant invention resides in the provision of an economical universal joint wherein the body of the joint may be die cast, and little or no machining of parts is required in the making of the joint.

It is a still further object of this invention to provide a strong and economical universal joint that is extremely easily assembled.

Also a feature of the invention is the provision of a universal joint which seldom requires lubrication since the joint itself carries sufficient lubrication for use over a long duration of time.

While some of the more salient features, characteristics and advantages of the instant invention have been above pointed out, others will become apparent from the following disclosures, taken in conjunction with the accompanying drawing, in which:

FIGURE 1 is an elevational view of a universal joint embodying principles of the instant invention;

FIGURE 2 is a longitudinal central vertical sectional view of the structure of FIGURE 1, with parts shown in elevation, taken substantially as indicated by the line II—II of FIGURE 1, looking in the direction of the arrows; and FIGURE 3 is a central transverse vertical sectional view, with parts in elevation, taken substantially as indicated by the line III—III of FIGURE 1.

As shown on the drawings:

In the illustrated embodiment of the instant invention, there is shown a universal joint embodying a yoke member 1 having opposed confronting arms 2 and 3 extending therefrom; and a like yoke member 4 having arms 5 and 6 extending therefrom. The body member of the joint is made up of two identical half portions 7 and 8. The yoke members are connected to the body member for relative movement therebetween by means of a plurality of identical studs or balls 9, there being four shown in the illustrated embodiment. This likeness of different parts of the joint obviously adds to the economy of manufacture of the joint.

Each yoke member is provided with an aperture 10 in each arm thereof to establish connection with a respective ball or sphere 9, and also with a large aperture 11 in the yoke part thereof to facilitate coupling the respective yoke member to a shaft by any suitable connecting means, not shown in the drawings.

Each ball or sphere 9 has a portion thereof ground away to provide a stud-like neck 12 for insertion in an aperture 10 in an arm of a yoke member. The ball is then securely attached to the yoke member as by welding the neck 10 to the arm of the yoke member, or in an equivalent manner. In the illustrated instance, therefore, each yoke member and a pair of balls 9 connected to the arms thereof become substantially an integral unit.

Each ball 9 may initially be in the form of a hardened steel ball of commercial ball bearing quality and shaped to provide the neck 12 with a suitable grinding machine. No fine machining of the ball is required or necessary in the making of the universal joint, because such balls may be economically purchased on the open market and possess a surface sufficiently smooth to function as a bearing surface.

Each half of the body of the joint, body member 7 or body member 8, may be die cast if desired, or otherwise formed in the shape of a hemisphere. Leading in from the flat face thereof, the hemisphere is provided with a plurality of partial hemispherical sockets 13, one for each ball 9 used in the joint. In addition, a central substantially cylindrical socket or recess 14 is provided which when joined with the similar recess in the other body member forms a central opening or lubricant chamber in direct communication with the balls.

In assembling the instant universal joint, it is a simple expedient to first attach the balls 9 to the arms of each yoke member. Then a half body portion 7 or 8 is inserted in each yoke member, the yoke members disposed at an angle of 90° relatively to each other, and the body members joined through the openings 11 in the yoke members by a bolt and nut assembly 15 extending centrally therethrough, with the balls firmly held in the sockets 13 of the body members.

It will be especially noted that the joint cannot pull apart in use since the balls 9 are firmly secured to the arms of the yoke members, and these balls are held by the body members 7 and 8 outwardly of the maximum ball diameter. It will further be noted that the bearing surfaces between the balls and the body members are spherical rather than cylindrical, and thus these bearing surfaces are not subject to injury by bending forces during operation of the joint and, as previously stated, these bearing surfaces do not require fine machining. It will also be noted that the bearing surfaces are quite large in comparison with the size of the joint whereby wear is lessened materially and the life of the joint considerably increased, while the capacity of the joint is exceptional for its size. Further, lubrication for an extremely long duration of time and use is amply provided for at the outset by filling the internal chamber 14 with the proper lubricant. This lubricant is automatically fed directly to the balls and thus between the bearing surfaces of the balls and the body members.

It will be understood that modifications and variations may be effected without departing from the scope of the novel concepts of the present invention.

I claim as my invention:

1. In a universal joint, a pair of yoke members each having a pair of confronting arms with an aperture in each arm, a stud having a spherical head for each said arm, each said stud comprising a ball with a portion ground away to define a short neck extending from the remainder of the stud, the neck of each said stud being secured in an aperture in one of said arms, a generally spherical body comprising two like halves with confronting flat faces, each body half having a recess for each stud head to form a socket when associated with a corresponding recess in the other body half, and means extending through said body halves to join the same together with a stud head in each socket and the confronting faces of the body halves in contact with each other.

2. In a universal joint, a pair of yoke members each having a pair of confronting arms, a stud having a generally spherical head extending directly from each said arm, a generally spherical body comprising two like halves with confronting flat faces, each of said body halves having a recess for each said stud head to form a socket when associated with a recess in the other body half to receive the major portion of a stud head with the remainder of the head projecting outside said body, each of said body halves having a central recess to conjointly form a lubricant chamber into which a portion of each stud head projects, and means securing said body halves together with confronting faces in tight contact with each other.

3. In a universal joint, a pair of yoke members each having a pair of confronting arms, a stud having a generally spherical head extending directly from each said arm, a body comprising two halves with complemental confronting and contacting faces, said body having outer complemental recesses to form a socket receiving the major portion of each stud head with the remainder of the stud head projecting from the socket, said body having complemental recesses centrally thereof and intersecting said outer recesses to form a lubricant chamber, and means securing said body halves together with the confronting faces thereof in tight contact.

References Cited in the file of this patent

UNITED STATES PATENTS

| 1,358,221 | Leppert | Nov. 9, 1920 |
| 1,381,600 | Thiemer | June 14, 1921 |
| 1,643,017 | Hufferd | Sept. 20, 1927 |
| 1,677,311 | Weiss | July 17, 1928 |
| 1,913,045 | Wood | June 6, 1933 |
| 2,545,646 | Blinkman | Mar. 20, 1951 |

FOREIGN PATENTS

| 11,769 | Great Britain | Apr. 6, 1916 |
| 127,436 | Great Britain | June 5, 1919 |